United States Patent
De Jager et al.

(10) Patent No.: US 12,442,133 B2
(45) Date of Patent: Oct. 14, 2025

(54) ROPE HAVING AN END CONNECTOR SEGMENT COMPRISING TWO ROPE-BRANCHES WITH UNEQUAL LENGTHS

(71) Applicant: Lankhorst Touwfabrieken B.V., Sneek (NL)

(72) Inventors: Pieter De Jager, Sliedrecht (NL); Adrianus Stout, Alblasserdam (NL)

(73) Assignee: Lankhorst Touwfabrieken B.V., Sneek (NL)

( * ) Notice: Subject to any disclaimer, the term of this patent is extended or adjusted under 35 U.S.C. 154(b) by 1000 days.

(21) Appl. No.: 17/595,586

(22) PCT Filed: Feb. 24, 2020

(86) PCT No.: PCT/NL2020/050114
§ 371 (c)(1),
(2) Date: Nov. 19, 2021

(87) PCT Pub. No.: WO2020/235993
PCT Pub. Date: Nov. 26, 2020

(65) Prior Publication Data
US 2022/0081832 A1    Mar. 17, 2022

(30) Foreign Application Priority Data
May 21, 2019 (EP) .................................... 19175709

(51) Int. Cl.
*D07B 1/18* (2006.01)
*B66C 1/12* (2006.01)
*F16G 11/00* (2006.01)

(52) U.S. Cl.
CPC ................ *D07B 1/185* (2013.01); *B66C 1/12* (2013.01); *F16G 11/00* (2013.01); *D07B 2201/1004* (2013.01)

(58) Field of Classification Search
CPC .. D07B 1/185; D07B 1/18; D07B 2201/1004; B66C 1/12; F16G 11/00; F16G 11/14; F16G 15/06
See application file for complete search history.

(56) References Cited

U.S. PATENT DOCUMENTS 1,386,052 A * 8/1921 Duggan ................. B60D 1/187
                                                    280/480
1,924,992 A * 8/1933 Jasper ....................... B60D 1/18
                                                    280/480

(Continued)

FOREIGN PATENT DOCUMENTS

| CN | 103276616 A | 9/2013 |
| WO | 2005/054710 A1 | 6/2005 |

(Continued)

OTHER PUBLICATIONS

International Search Report for corresponding International Application No. PCT/NL2020/050114 dated Jun. 4, 2020, 5 pages.

*Primary Examiner* — Stephen A Vu
(74) *Attorney, Agent, or Firm* — Chrisman Gallo Tochtrop LLC

(57) ABSTRACT

A rope includes a main rope segment, a branching position and an end connector segment, wherein the end connector segment includes a first rope-branch, which includes a first rope-branch-eye, and a second rope-branch, which includes a second rope-branch-eye, wherein an attainable maximum first effective length of the first rope-branch is higher than 120% of an attainable maximum second effective length of the second rope-branch. The rope allows for alternative favourable manners of connecting the rope to other ropes and to other types of external objects.

8 Claims, 8 Drawing Sheets

(56) References Cited

U.S. PATENT DOCUMENTS

| | | | | |
|---|---|---|---|---|
| 3,397,026 A | * | 8/1968 | Spina | G02C 3/003 |
| | | | | 2/13 |
| 3,718,947 A | * | 3/1973 | Huber | B66C 1/14 |
| | | | | 24/298 |
| 4,036,101 A | * | 7/1977 | Burnett | F16G 11/14 |
| | | | | 87/8 |
| 4,405,034 A | * | 9/1983 | Dunne | B63B 27/14 |
| | | | | 182/100 |
| 5,083,875 A | * | 1/1992 | Cedrone | G02B 6/4429 |
| | | | | 385/139 |
| 2017/0274965 A1 | | 9/2017 | Beck | |

FOREIGN PATENT DOCUMENTS

| | | |
|---|---|---|
| WO | 2011/071387 A1 | 6/2011 |
| WO | 2012/150469 A2 | 11/2012 |

* cited by examiner

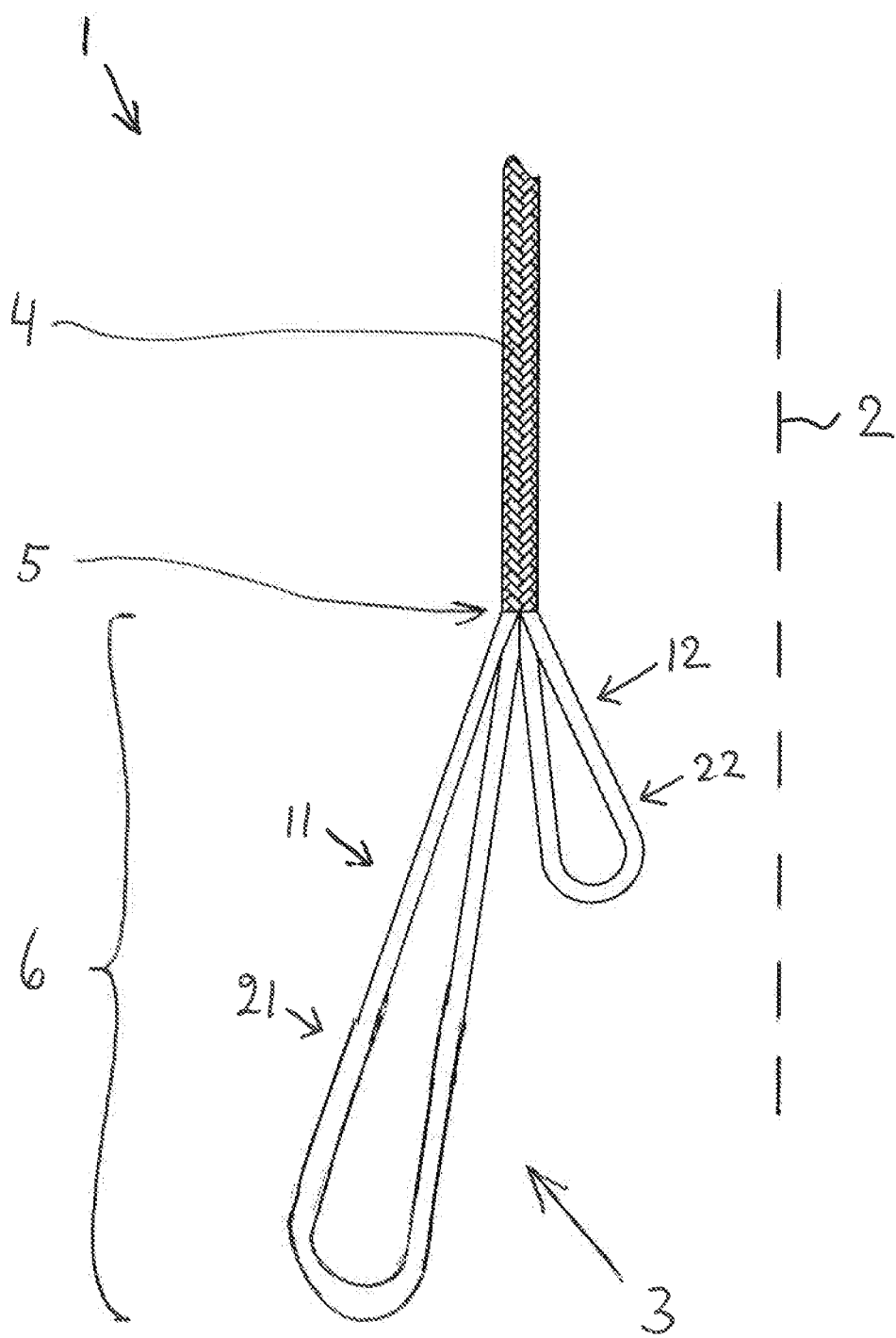

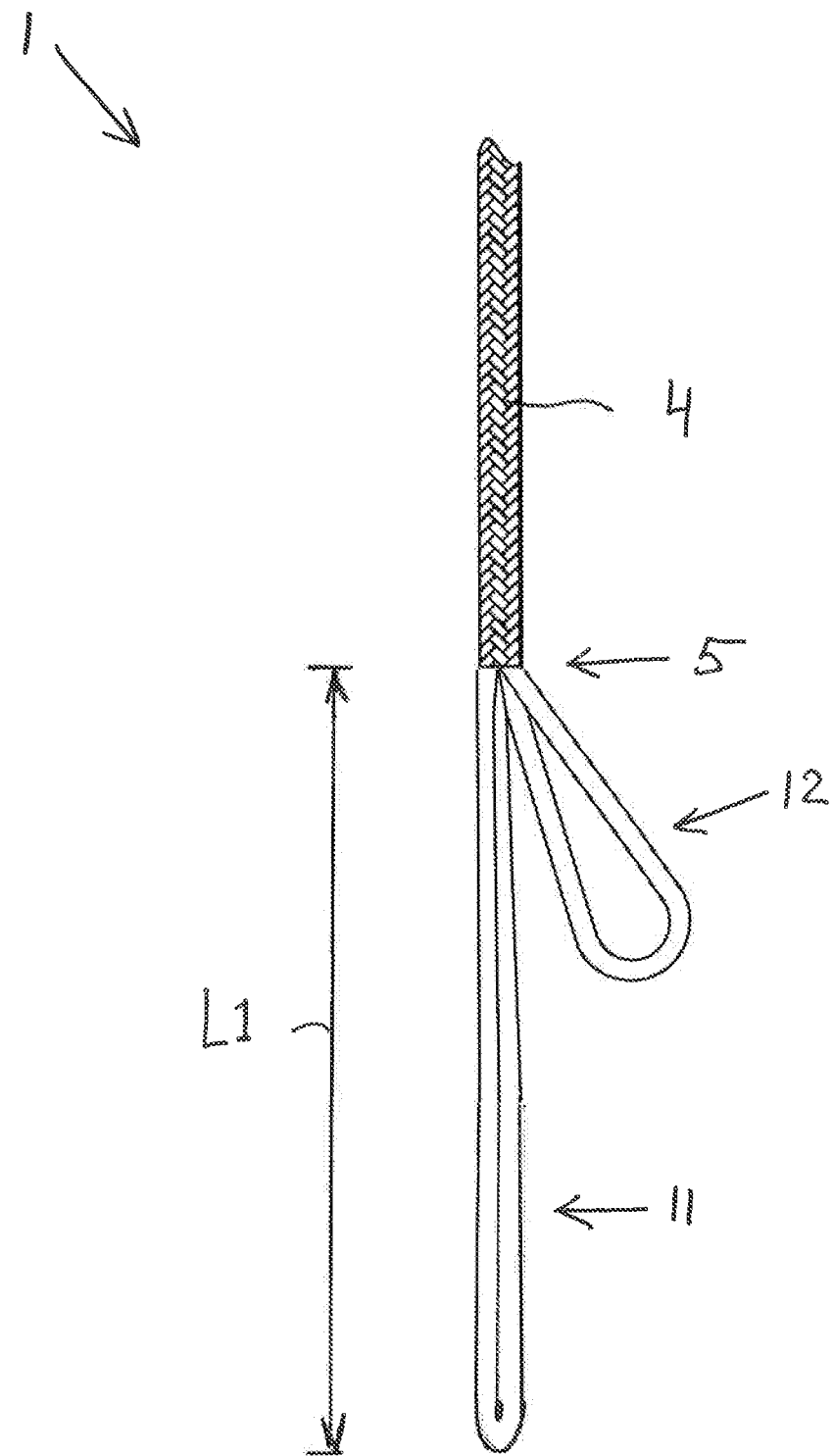

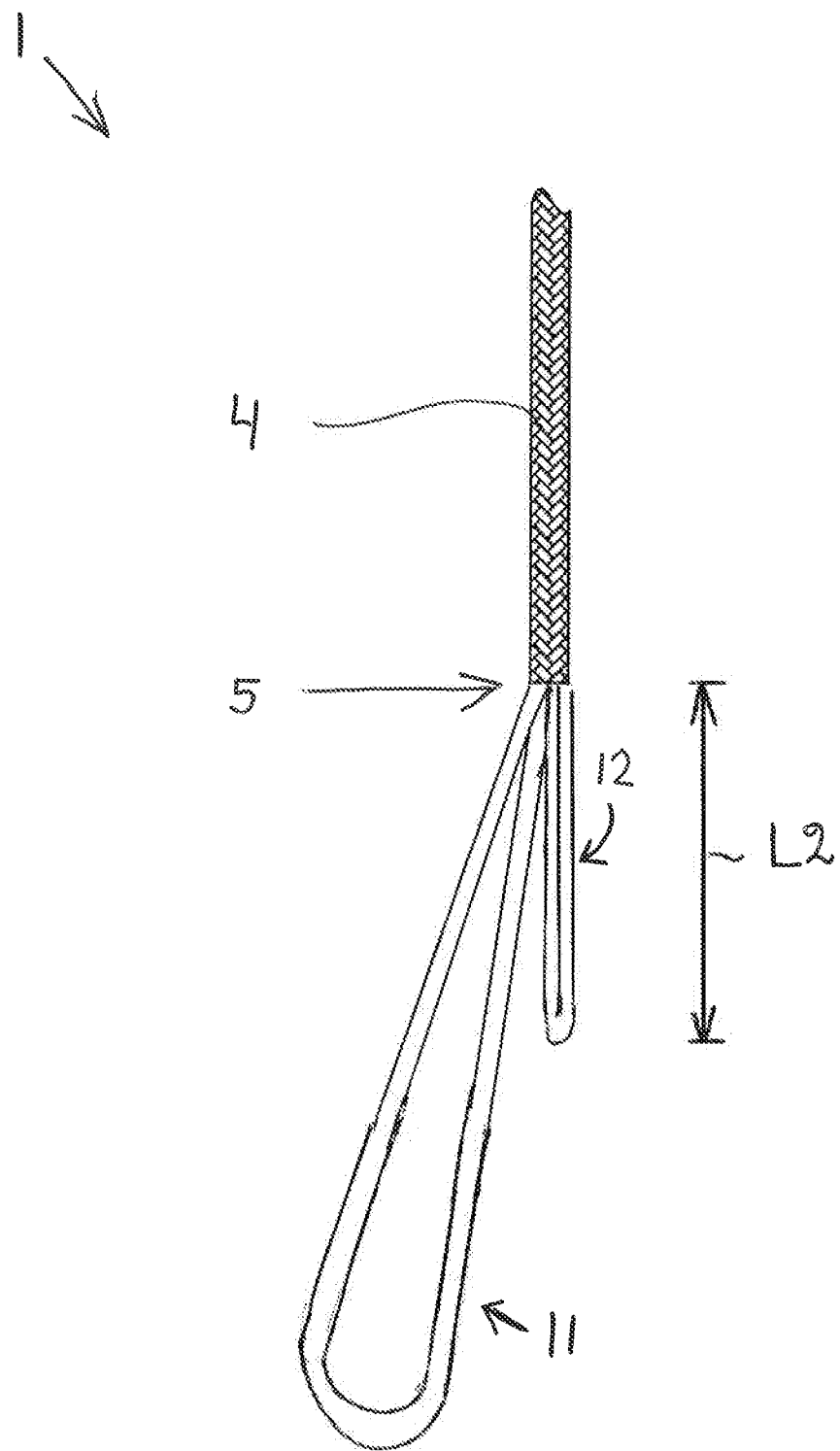

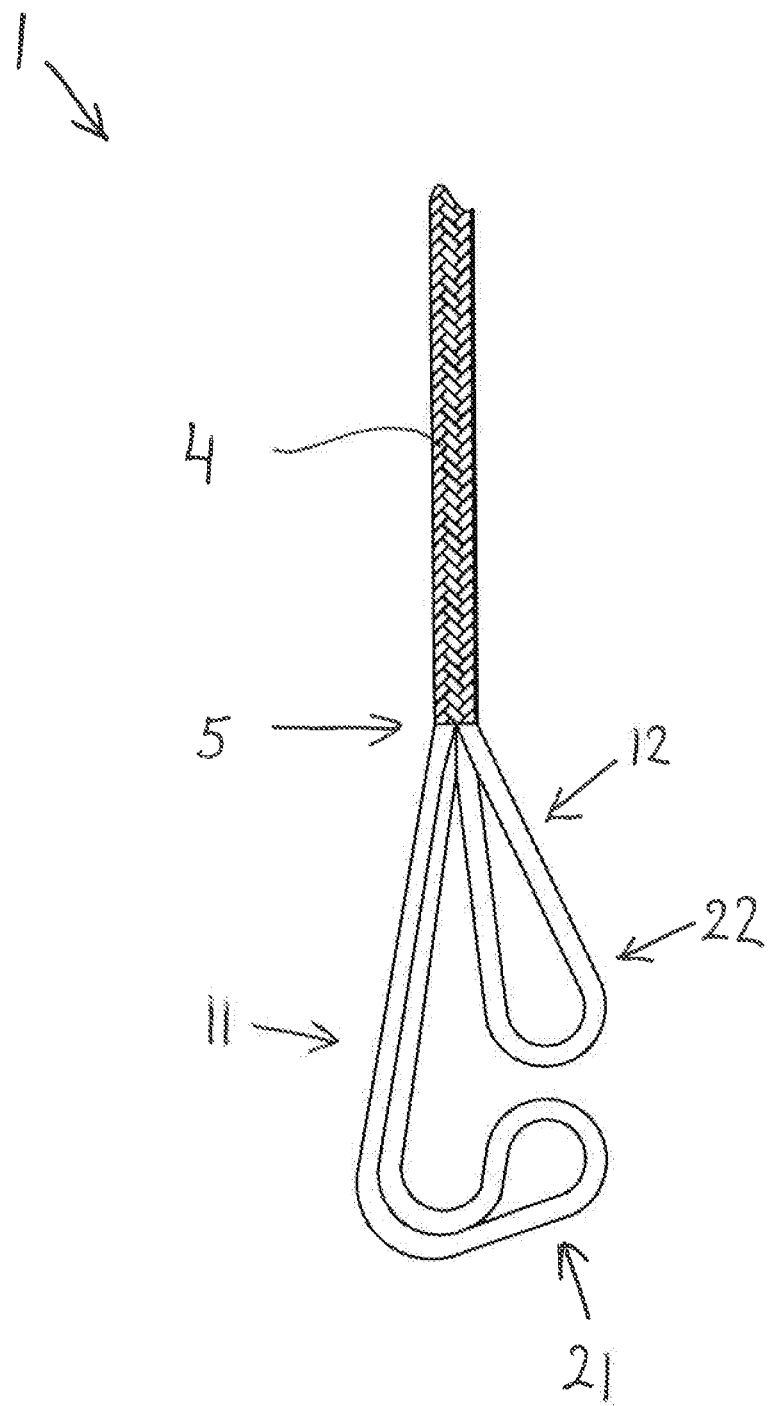

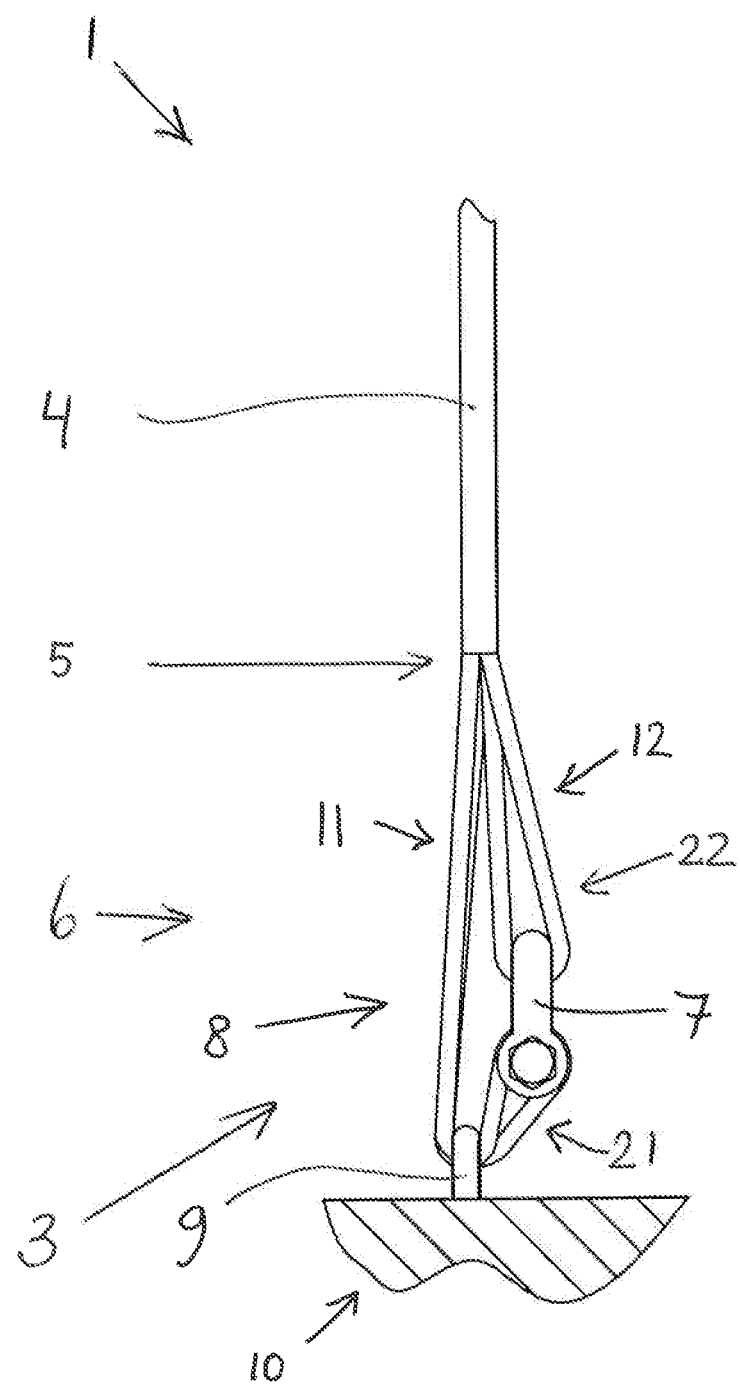

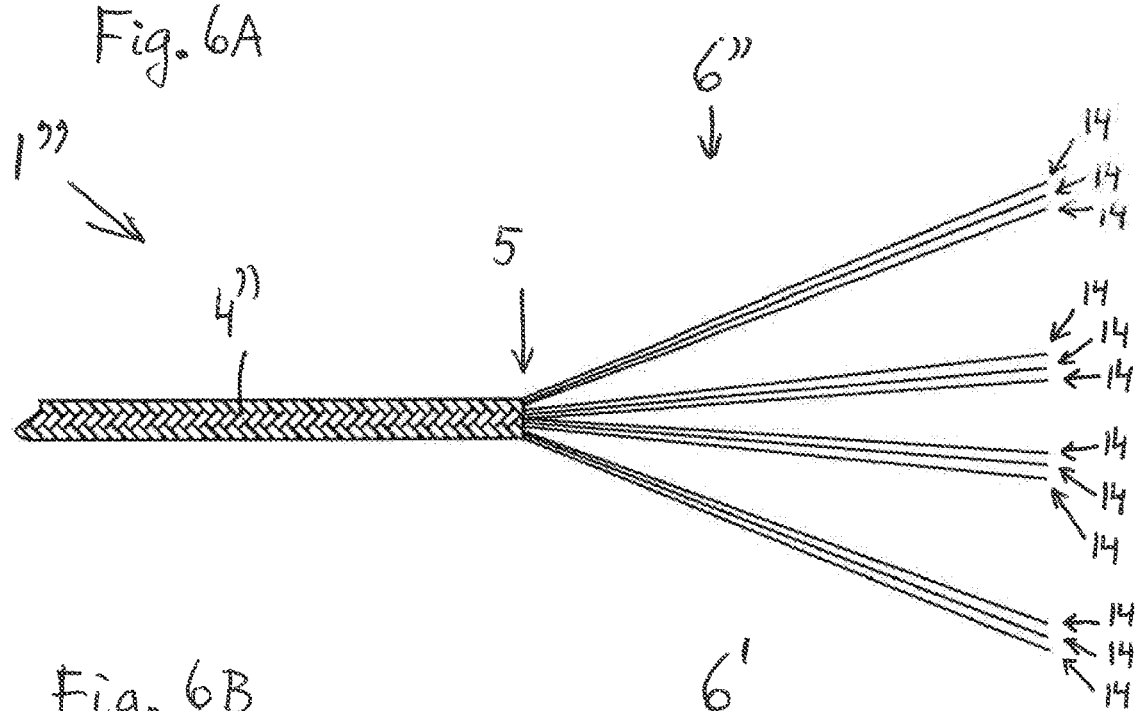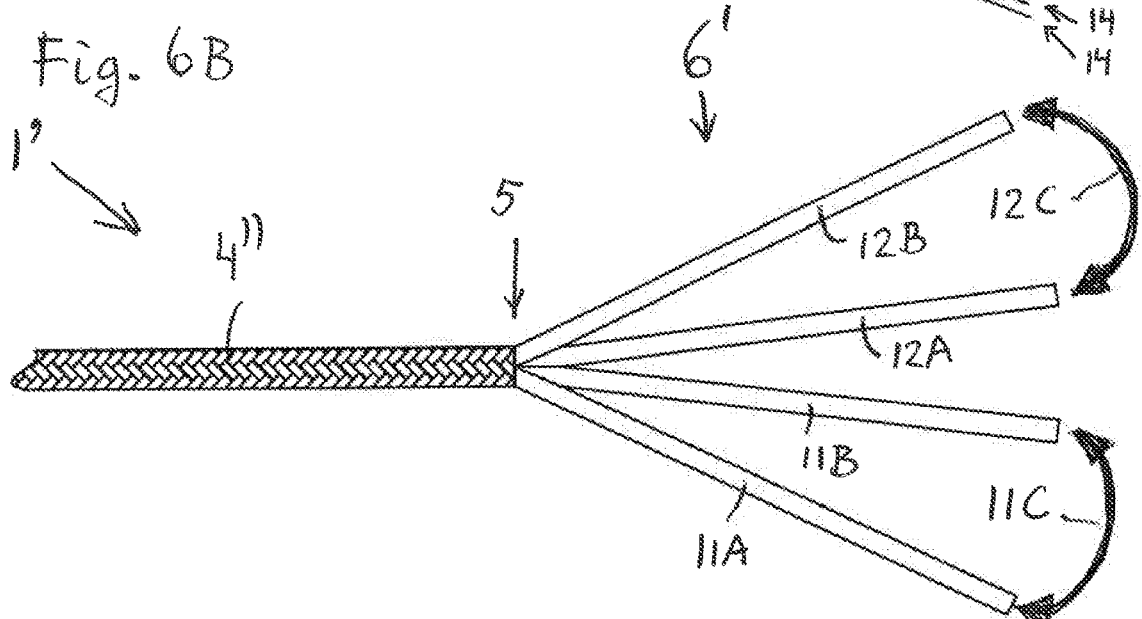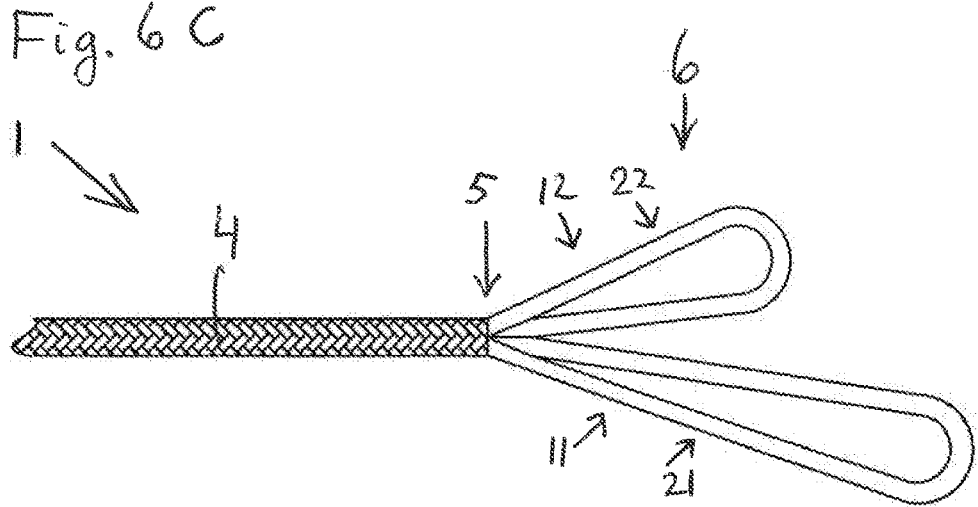

ROPE HAVING AN END CONNECTOR SEGMENT COMPRISING TWO ROPE-BRANCHES WITH UNEQUAL LENGTHS

FIELD OF THE INVENTION

The invention relates to a rope, wherein the rope along a longitudinal rope direction of the rope towards a longitudinal rope end of the rope successively comprises at least a main rope segment, a branching position and an end connector segment, wherein:
- the branching position is a fixed position along the longitudinal rope direction,
- the end connector segment is formed by all parts of the rope that, as seen in said longitudinal rope direction, are extending from the branching position up to the longitudinal rope end,
- the end connector segment has two, and only two, branches of the rope,
- said two branches of the rope are consisting of a first rope-branch and a second rope-branch, which at said branching position are branched off from the main rope segment, and
- the first rope-branch comprises a first rope-branch-eye and the second rope-branch comprises a second rope-branch-eye.

The invention further relates to use of such a rope, as well as to a method of manufacturing such a rope.

The rope according to the invention may be used offshore as well as onshore, for example as a lifting rope, a towing rope, a mooring rope, or the like.

BACKGROUND

A rope of the type as initially identified above is known from WO 2012/150469 A2. See for example the rope 100 or the rope 200 of FIG. 9 of the Abstract of WO 2012/150469 A2. It is seen that said rope 100 has the end connector segment 116 having the first rope-branch-eye 50 and the second rope-branch-eye 52. Similarly, said rope 200 has the end connector segment 216 having the first rope-branch-eye 250 and the second rope-branch-eye 252. It is further seen that a connecting component in the form of the shown connecting spool 58 can be used to connect the ropes 100 and 200 together end-to-end.

It is an object of the present invention to provide an alternative rope, which allows for alternative favourable manners of connecting the rope to other ropes and to other types of external objects.

BRIEF SUMMARY OF THE INVENTION

For that purpose the invention provides a rope according to the appended independent claim 1, use of such a rope according to the appended independent claim 4, and a method of manufacturing such a rope according to the appended independent claim 6. Specific embodiments of the invention are set forth in the appended dependent claims 2, 3 and 5.

Hence, the invention provides a rope, wherein the rope along a longitudinal rope direction of the rope towards a longitudinal rope end of the rope successively comprises at least a main rope segment, a branching position and an end connector segment, wherein:
- the branching position is a fixed position along the longitudinal rope direction,
- the end connector segment is formed by all parts of the rope that, as seen in said longitudinal rope direction, are extending from the branching position up to the longitudinal rope end,
- the end connector segment has two, and only two, branches of the rope,
- said two branches of the rope are consisting of a first rope-branch and a second rope-branch, which at said branching position are branched off from the main rope segment, and
- the first rope-branch comprises a first rope-branch-eye and the second rope-branch comprises a second rope-branch-eye, characterized in that
- an attainable maximum first effective length of the first rope-branch is higher than 120% of an attainable maximum second effective length of the second rope-branch.

As used herein, an attainable maximum first effective length of the first rope-branch equals a vertical first length along the first rope-branch as measured in a first reference condition of the rope, wherein in said first reference condition the first rope-branch, as well as its first rope-branch-eye, are as much as possible in a first plumb line configuration, in which the very end of the first rope-branch-eye corresponds to the lowest part of the first rope-branch-eye and is considered to be a concentrated first plumb mass point of the first plumb line configuration, and wherein said vertical first length is measured from the branching position up to said very end of the first rope-branch-eye. Analogously, as used herein, an attainable maximum second effective length of the second rope-branch equals a vertical second length along the second rope-branch as measured in a second reference condition of the rope, wherein in said second reference condition the second rope-branch, as well as its second rope-branch-eye, are as much as possible in a second plumb line configuration, in which the very end of the second rope-branch-eye corresponds to the lowest part of the second rope-branch-eye and is considered to be a concentrated second plumb mass point of the second plumb line configuration, and wherein said vertical second length is measured from the branching position up to said very end of the second rope-branch-eye.

As mentioned, according to the present invention the attainable maximum first effective length of the first rope-branch is higher than 120% of the attainable maximum second effective length of the second rope-branch. The inventors of the present invention have devised that the resulting asymmetry of the end connector segment of a rope according to the invention allows for alternative favourable manners of connecting the rope to other ropes and to other types of external objects. That is, the inventors have devised that a link structure can be used to interconnect the first rope-branch-eye and the second rope-branch-eye, so that the first rope-branch, the second rope-branch and said link structure together will form a rope-eye at said longitudinal rope end of the rope, wherein said rope-eye is suitable for connecting the rope to external objects. Said link structure may comprise a link in the form of a shackle of hard and/or soft materials, or wherein said link structure comprises a chain of links, such as a chain of at least two shackles of hard and/or soft materials.

For example, the rope according to the invention can be used as a lifting rope for a hoisting load which has a lifting lug. This can be done as follows. Firstly, the lifting rope can be hung vertically above the hoisting load, with the end connector segment of the rope nearby the lifting lug of the hoisting load. Next, an operator can pass the end of the longer first rope-branch through the lifting lug and then upwards towards the shorter second rope-branch, where a link structure can be effectuated to interconnect the first rope-branch-eye and the second rope-branch-eye, so that the first rope-branch, the second rope-branch and said link structure together will form a rope-eye at the longitudinal rope end of the rope. This way, the formed rope-eye of the rope effectively engages the lifting lug of the hoisting load for lifting purposes.

It is noted that the rope known from the above-mentioned document WO 2012/150469 A2 has a symmetrical end connector segment having first and second rope-branches of mutually equal attainable maximum first and second effective lengths, respectively. The rope according to the present invention, on the other hand, has an asymmetrical end connector segment having first and second rope-branches of mutually unequal attainable maximum first and second effective lengths, respectively.

An advantage of the mutually unequal maximum effective lengths of the two rope-branches of a rope according to the invention is that the above-mentioned interconnecting link structure is positioned asymmetrically within the formed rope-eye. Thanks to this asymmetrical positioning of the link structure, the link structure only needs to carry roughly half of the load during lifting, as compared to a symmetrically positioned link structure where the link structure would directly engage the lifting lug of the hoisting load. Thanks to this considerably lower loading of the link structure, the link structure can be designed relatively compact and light-weight.

Another advantage of the mutually unequal maximum effective lengths of the two rope-branches of a rope according to the invention is that it is optionally possible that at least part of the link structure is at least partly pre-mounted to the shorter second rope-branch prior to connecting the rope to the hoisting load. This pre-mounting is advantageous in that gravity will keep the at least part of the link structure nicely in place above the hoisting load. This saves a lot of unnecessary movements to be performed with a link structure when connecting the rope to the hoisting load. This is especially favourable in cases of link structures made of heavy materials and in cases of highly repetitive hoisting jobs with many hoisting loads.

In a preferable embodiment of a rope according to the invention:
- the rope comprises a first plurality of strands, a second plurality of strands, a third plurality of strands and a fourth plurality of strands,
- each strand of the first plurality of strands and of the second plurality of strands is continuously extending at least from within the main rope segment to within the first rope-branch,
- the first plurality of strands and the second plurality of strands are spliced end-to-end back into each other, thereby at least partially forming said first rope-branch-eye,
- each strand of the third plurality of strands and of the fourth plurality of strands is continuously extending at least from within the main rope segment to within the second rope-branch, and
- the third plurality of strands and the fourth plurality of strands are spliced end-to-end back into each other, thereby at least partially forming said second rope-branch-eye.

This preferable embodiment of the invention allows to manufacture the rope, including its specifically configured end connector segment, of a more or less continuously stranded rope construction, providing the advantages of a strong and compact rope construction. It also allows for making flexible rope-branch-eyes and thereby it allows for highly interesting uses such as passing rope-branch-eyes through a lifting lug of an object to be hoisted.

BRIEF DESCRIPTION OF THE DRAWINGS

In the following, the invention is further elucidated with reference to non-limiting embodiments and with reference to the schematic figures in the attached drawing, in which the following is shown.

FIG. 1 shows in a side view an example of a first embodiment of a rope according to the invention, wherein the rope is hanging with its main rope segment extending vertically and with its end connector segment below.

FIG. 2 shows the rope of FIG. 1 in a similar situation as in FIG. 1, however wherein this time the rope is shown in its above-mentioned first reference condition in order to illustrate the attainable maximum first effective length of the first rope-branch of the rope.

FIG. 3 shows the rope of FIG. 1 in a similar situation as in FIG. 1, however wherein this time the rope is shown in its above-mentioned second reference condition in order to illustrate the attainable maximum second effective length of the second rope-branch of the rope.

FIG. 4 shows the rope of FIG. 1 in a similar situation as in FIG. 1, however wherein this time an end portion of the longer first rope-branch has been bent upwards toward the end of the shorter second rope-branch.

FIG. 5 shows the rope of FIG. 1 in a similar situation as in FIG. 4, however wherein this time the end portion of the longer first rope-branch has been passed through a lifting lug of a hoisting load and a link structure has been effectuated to interconnect the first rope-branch-eye and the second rope-branch-eye.

FIGS. 6A, 6B, 6C illustrate an example of a first embodiment of a method of manufacturing a rope according to the invention.

DETAILED DESCRIPTION

Figure 7A:
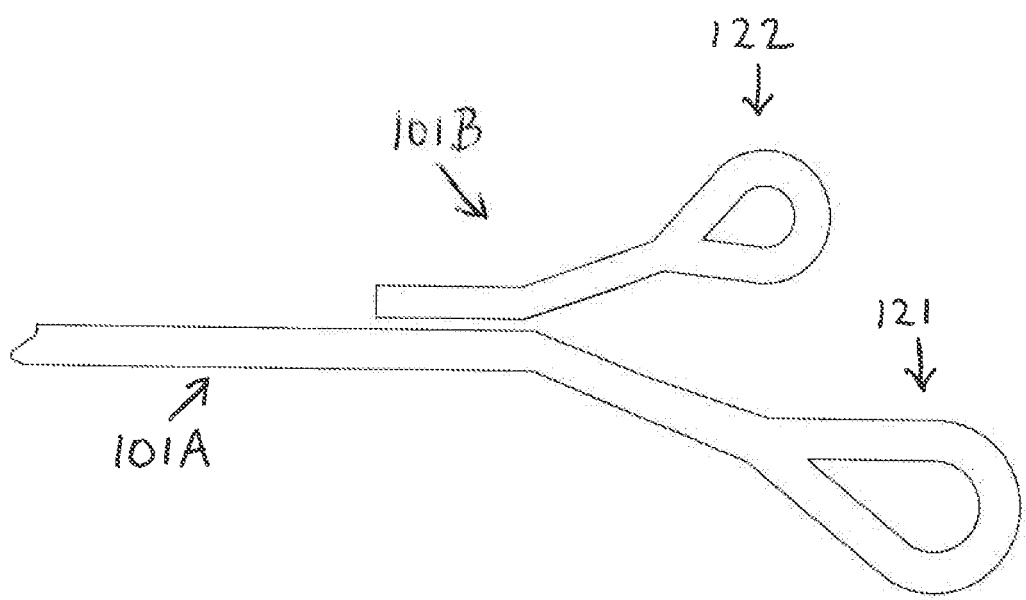
FIGS. 7A, 7B illustrate an example of a second embodiment of a method of manufacturing a rope according to the invention.

Now, reference is first made to FIGS. 1-5. The reference signs used in FIGS. 1-5 are referring to the abovementioned parts and aspects of the invention, as well as to related parts and aspects, in the following manner.
1 rope
2 longitudinal rope direction
3 longitudinal rope end
4 main rope segment
5 branching position
6 end connector segment
7 link structure
8 rope-eye
9 lifting lug
10 external object (e.g. a hoisting load)
11 first rope-branch
12 second rope-branch
21 first rope-branch-eye
22 second rope-branch-eye
L1 attainable maximum first effective length L2 attainable maximum second effective length Based on the above introductory description, including the brief description of the drawing figures, and based on the above-listed reference signs used in FIGS. 1-5, the examples of FIGS. 1-4 are readily self-explanatory.

FIG. 5 illustrates a use, according to the invention, of the rope 1 according to the invention. In FIG. 5 it is seen that an end portion of the longer first rope-branch 11 has been passed through the lifting lug 9 of an external object in the form of the shown hoisting load 10. In FIG. 5 it is further seen that the link structure 7 has been used to interconnect the first rope-branch-eye 21 and the second rope-branch-eye 22, so that the first rope-branch 11, the second rope-branch 12 and the link structure 7 together are forming the rope-eye 8 at the longitudinal rope end 3 of the rope 1.

Accordingly, in FIG. 5 the formed rope-eye 8 is connecting the rope 1 to the hoisting load 10. From FIG. 5 it will be understood that the load is evenly distributed over the left-side and right-side halves of the rope-eye 8. In FIG. 5 it is further seen that the link structure 7 is part of the right-side half of the rope-eye 8. Thanks to this asymmetrical positioning of the link structure 7, the link structure 7 only needs to carry roughly half of the load during lifting, as compared to a considered symmetrically positioned link structure in a considered different rope having a symmetrical end connector segment having first and second rope-branches of mutually equal attainable maximum first and second effective lengths, respectively, where the symmetrically positioned link structure would directly engage the lifting lug 9 of the hoisting load 10. Thanks to this considerably lower loading of the asymmetrically positioned link structure 7 according to the invention, the link structure 7 can be designed relatively compact and light-weight.

From FIG. 5 it will further be appreciated that according to the invention it is optionally possible that at least part of the link structure 7 is at least partly pre-mounted to the shorter second rope-branch 12 prior to connecting the rope 1 to the hoisting load 10. This pre-mounting is advantageous in that gravity will keep the at least part of the link structure 7 nicely in place above the hoisting load 10. This saves a lot of unnecessary movements to be performed with a link structure when connecting a rope to a hoisting load. This is especially favourable in cases of link structures made of heavy materials and in cases of highly repetitive hoisting jobs with many hoisting loads.

Reference is now made to FIGS. 6A, 6B, 6C, which illustrate an example of a first embodiment of a method of manufacturing a rope according to the invention, more specifically a method of manufacturing the rope 1 of FIGS. 1-5.

The rope 1" of FIG. 6A comprises a main rope segment 4" of, for example, braided or laid rope strands. The rope 1" further comprises the branching position 5 and a rope end segment 6". In the shown example, the rope end segment 6" comprises twelve rope strands 14. It is noted that the construction of the rope end segment 6" previously was identical to and integral with the rope construction of the main rope segment 4". In fact, the twelve rope strands 14 of the rope end segment 6" as shown in FIG. 6A were obtained by mutually disentangling (for example un-braiding or un-laying) the rope strands of said previously identical and integral rope construction.

The rope 1' of FIG. 6B has the same main rope segment 4" and the same branching position 5 as the rope 1" of FIG. 6A. However, the rope 1' of FIG. 6B has a rope end segment 6', which is different from the rope end segment 6" of the rope 1" of FIG. 6A. That is, the rope 1' of FIG. 6B has four rope end portions 11A, 11B, 12A, 12B. Each of said rope end portions 11A, 11B, 12A, 12B has been obtained by mutually entangling (for example braiding or laying) three of the twelve rope strands 14 of the rope 1" of FIG. 6A. Purely to illustratively elucidate this, the twelve mutually disentangled rope strands 14 in FIG. 6A are shown in four separately arranged groups, each having three mutually disentangled rope strands 14.

The rope 1 of FIG. 6C is obtained by splicing the rope end portions 11A and 11B of the rope 1' of FIG. 6B end-to-end back into each other to form the first rope-branch 11 having the first rope-branch-eye 21, and by splicing the rope end portions 12A and 12B of the rope 1' of FIG. 6B end-to-end back into each other to form the second rope-branch 12 having the second rope-branch-eye 22. In FIG. 6B said splicings of rope end portions end-to-end back into each other have been highly schematically indicated by the two-way arrows 11C and 12C, respectively. Each of said splicings 11C and 12C of rope end portions end-to-end back into each other may for example be performed by, or in combination with, any one of the many various methods disclosed in WO 2011/071387 A1, such as by, or in combination with, any one of the methods according to any one of the claims 18-34 of WO 2011/071387 A1. Optionally, each of said splicings 11C and 12C of rope end portions end-to-end back into each other may even be extended with splicing one, more, or all of the rope end portions 11A, 11B, 12A, 12B partly back into the main rope segment 4" of the rope 1' of FIG. 6B to obtain the main rope segment 4 of the rope 1 of FIG. 6C.

It is noted that the mutually unequal lengths L1 and L2 of the two rope-branches 11 and 12 of the rope 1 (see FIGS. 2 and 3) may for example be obtained by shortening the rope strands 14 used for the rope end portions 12A, 12B prior to splicing the rope end portions 12A and 12B of the rope 1' of FIG. 6B end-to-end back into each other to form the second rope-branch 12 having the second rope-branch-eye 22.

It is further noted that an alternative way of forming the first rope-branch-eye 21 out of the rope end portions 11A and 11B of the rope 1' of FIG. 6B may be realized by using the concept of a "multi-strand coupling rope" as disclosed in the above-mentioned document WO 2012/150469 A2, such as for example the multi-strand coupling rope 18a shown in FIG. 5 of WO 2012/150469 A2. Similarly, such a multi-strand coupling rope may also be used for forming the second rope-branch-eye 22 out of the rope end portions 12A and 12B of the rope 1' of FIG. 6B.

Figure 7B:
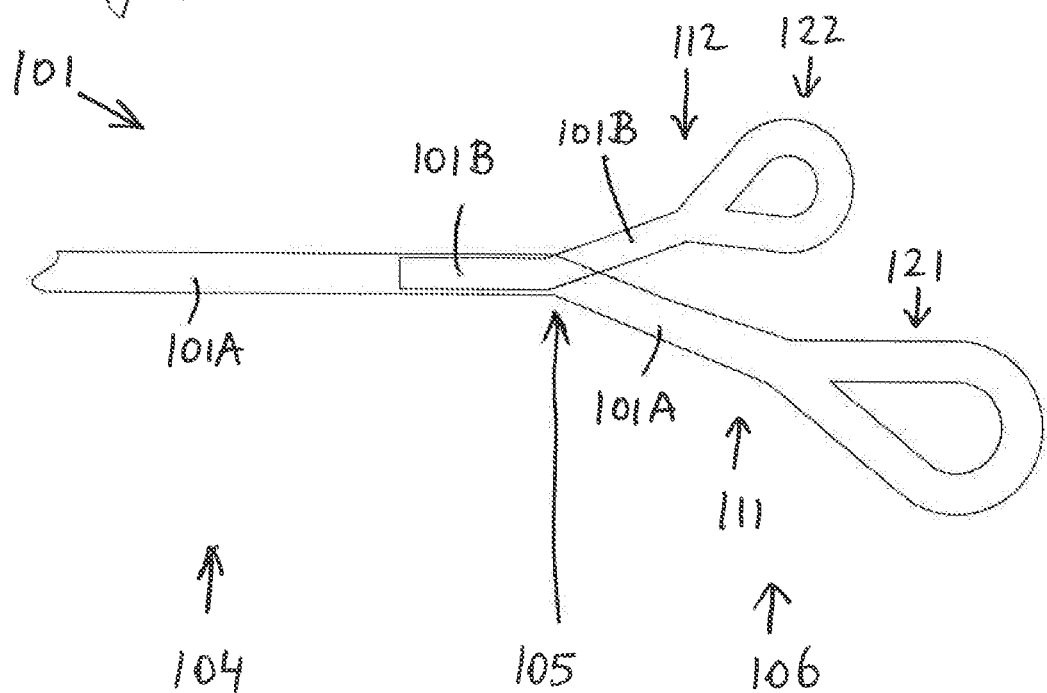

Reference is now made to FIGS. 7A, 7B, which illustrate an example of a second embodiment of a method of manufacturing a rope according to the invention, more specifically a method of manufacturing the rope 101 of FIG. 7B.

FIG. 7A shows two separate first and second ropes 101A and 101B, respectively. The first rope 101A has a first eye 121 at an end of the first rope 101A. The rope 101B has a second eye 122 at an end of the second rope 101B. Each of the first and second ropes 101A and 101B can be manufactured by many various methods, for example by, or in combination with, any one of the many various methods disclosed in WO 2011/071387 A1, such as by, or in combination with, any one of the methods according to any one of the claims 18-34 of WO 2011/071387 A1.

The rope 101 of FIG. 7B is obtained by splicing a portion of a main rope segment of the rope 101B into a portion of a main rope segment of the rope 101A in such manner that the rope 101 has the shown main rope segment 104, the shown branching position 105 and the shown end connector segment 106 having the shown two rope-branches 111 and 112 of mutually unequal lengths, wherein the first rope-branch 111 comprises the first eye 121 of the first rope 101A as the first rope-branch-eye 121 of the rope 101, and wherein the second rope-branch 112 comprises the second eye 122 of the second rope 101B as the second rope-branch-eye 122 of the rope 101.

It is noted that many various splicing techniques may be applied for said splicing of a portion of the main rope segment of the rope 101B into a portion of the main rope segment of the rope 101A.

Figure 8A:
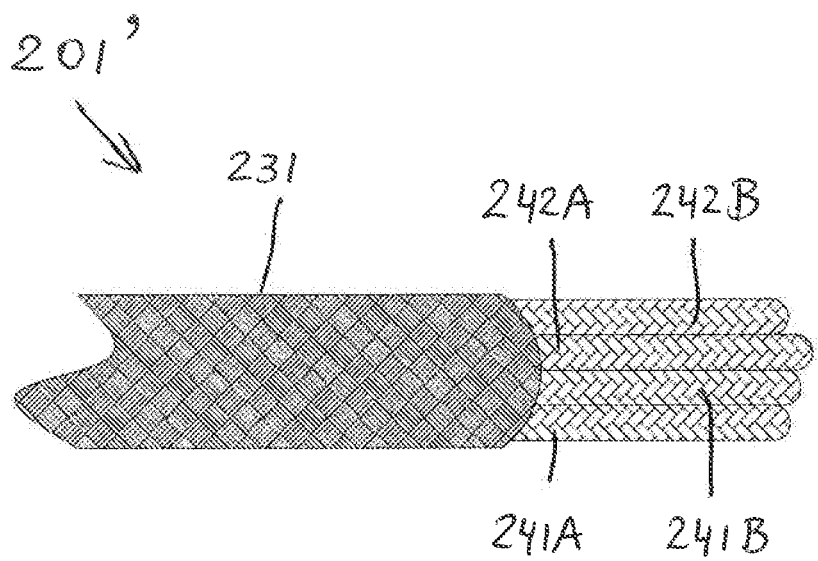
FIGS. 8A, 8B illustrate an example of a third embodiment of a method of manufacturing a rope according to the invention.
Figure 8B:
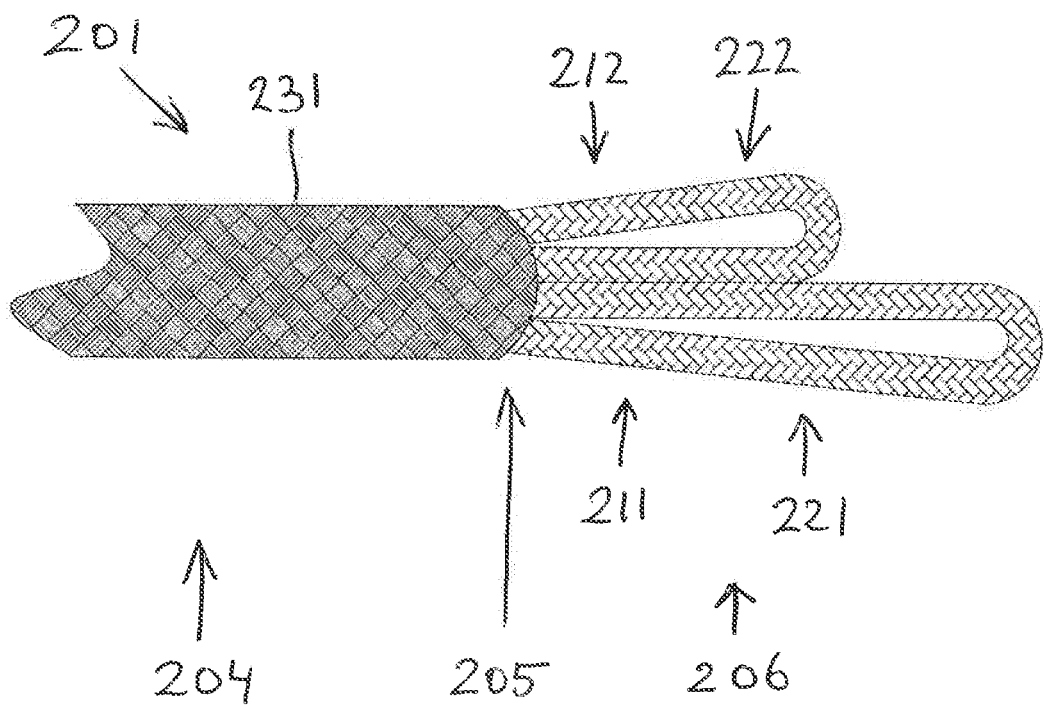

Reference is now made to FIGS. 8A, 8B, which illustrate an example of a third embodiment of a method of manufacturing a rope according to the invention, more specifically a method of manufacturing the rope 201 of FIG. 8B.

FIG. 8A shows a rope 201' of multiple load-bearing sub-ropes 241A, 241B, 242A, 242B within an outer jacket 231.

The rope 201 of FIG. 8B is obtained by coupling the sub-ropes 241A, 241B together and by coupling the sub-ropes 242A, 242B together, in such manner that the rope 201 has the shown main rope segment 204, the shown branching position 205 and the shown end connector segment 206 having the shown two rope-branches 211 and 212 of mutually unequal lengths, wherein the first rope-branch 211 comprises the shown first rope-branch-eye 221 of the rope 201, and wherein the second rope-branch 212 comprises the shown second rope-branch-eye 222 of the rope 201.

It is noted that many various coupling techniques may be applied for said coupling the sub-ropes 241A, 241B together and for said coupling the sub-ropes 242A, 242B together, for example the many various coupling techniques disclosed in the above-mentioned document WO 2012/150469 A2, or the many various splicing techniques disclosed in the above-mentioned document WO 2011/071387 A1.

It is further noted that each of the above-mentioned examples of a method of manufacturing a rope according to the invention (said examples being illustrated by FIGS. 6, 7, 8) can be used to manufacture a rope according to the above-mentioned "preferable embodiment" of a rope according to the invention. As mentioned in the introduction of the present disclosure, said "preferable embodiment" of a rope is characterized in that:
- the rope comprises a first plurality of strands, a second plurality of strands, a third plurality of strands and a fourth plurality of strands,
- each strand of the first plurality of strands and of the second plurality of strands is continuously extending at least from within the main rope segment to within the first rope-branch,
- the first plurality of strands and the second plurality of strands are spliced end-to-end back into each other, thereby at least partially forming said first rope-branch-eye,
- each strand of the third plurality of strands and of the fourth plurality of strands is continuously extending at least from within the main rope segment to within the second rope-branch, and
- the third plurality of strands and the fourth plurality of strands are spliced end-to-end back into each other, thereby at least partially forming said second rope-branch-eye.

If so manufactured, the respective ropes shown in FIGS. 6, 7, 8 have the following features.

For the rope 1 of FIG. 6C, the main rope segment 4, the first rope-branch 11 and the first rope-branch-eye 21 are each containing the first plurality of strands and the second plurality of strands, while the main rope segment 4, the second rope-branch 12 and the second rope-branch-eye 22 are each containing the third plurality of strands and the fourth plurality of strands.

For the rope 101 of FIG. 7B, the main rope segment 104, the first rope-branch 111 and the first rope-branch-eye 121 are each containing the first plurality of strands and the second plurality of strands, while the main rope segment 104, the second rope-branch 112 and the second rope-branch-eye 122 are each containing the third plurality of strands and the fourth plurality of strands.

For the rope 201 of FIG. 8B, the main rope segment 204, the first rope-branch 211 and the first rope-branch-eye 221 are each containing the first plurality of strands and the second plurality of strands, while the main rope segment 204, the second rope-branch 212 and the second rope-branch-eye 222 are each containing the third plurality of strands and the fourth plurality of strands.

It is remarked that the above-mentioned examples do not limit the invention, and that various alternatives are possible within the scope of the appended claims. In the claims, the word "comprising" does not exclude other elements or steps, and the indefinite article "a" or "an" does not exclude a plurality. A single unit may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A rope, wherein the rope along a longitudinal rope direction of the rope towards a longitudinal rope end of the rope successively comprises at least a main rope segment, a branching position and an end connector segment, wherein:
   the branching position is a fixed position along the longitudinal rope direction,
   the end connector segment is formed by all parts of the rope that, as seen in said longitudinal rope direction, are extending from the branching position up to the longitudinal rope end,
   the end connector segment has two, and only two, branches of the rope,
   said two branches of the rope are consisting of a first rope-branch and a second rope-branch, which at said branching position are branched off from the main rope segment,
   the first rope-branch comprises a first rope-branch-eye and the second rope-branch comprises a second rope-branch-eye, and
   an attainable maximum first effective length of the first rope-branch is higher than 120% of an attainable maximum second effective length of the second rope-branch.

2. The rope according to claim 1, wherein:
   the rope comprises a first plurality of strands, a second plurality of strands, a third plurality of strands and a fourth plurality of strands,
   each strand of the first plurality of strands and of the second plurality of strands is continuously extending at least from within the main rope segment to within the first rope-branch, the first plurality of strands and the second plurality of strands are spliced end-to-end back into each other, thereby at least partially forming said first rope-branch-eye, each strand of the third plurality of strands and of the fourth plurality of strands is continuously extending at least from within the main rope segment to within the second rope-branch, and the third plurality of strands and the fourth plurality of strands are spliced end-to-end back into each other, thereby at least partially forming said second rope-branch-eye.

3. The rope according to claim 1, wherein said attainable maximum first effective length is higher than 150% of said attainable maximum second effective length.

4. A method of using the rope according to claim 1, wherein a link structure is used to interconnect the first rope-branch-eye and the second rope-branch-eye, so that the first rope-branch, the second rope-branch and said link structure together are forming a rope-eye at said longitudinal rope end of the rope, wherein said rope-eye is suitable for connecting the rope to external objects.

5. The method according to claim 4, wherein said link structure comprises a link in the form of a shackle of hard and/or soft materials, or wherein said link structure comprises a chain of links.

6. The method according to claim 4, wherein said link structure comprises a chain of at least two shackles of hard and/or soft materials.

7. The rope according to claim 1, wherein said attainable maximum first effective length is higher than 200% of said attainable maximum second effective length.

8. The rope according to claim 1, wherein said attainable maximum first effective length is higher than 300% of said attainable maximum second effective length.

\* \* \* \* \*